(12) United States Patent
Hubbs

(10) Patent No.: US 6,821,332 B2
(45) Date of Patent: Nov. 23, 2004

(54) MALLEABLE SURFACE MATERIAL

(75) Inventor: Jonathan W. Hubbs, Phoenix, AZ (US)

(73) Assignee: Stabilizer Solutions, Inc., Phoenix, AZ (US)

( * ) Notice: Subject to any disclaimer, the term of this patent is extended or adjusted under 35 U.S.C. 154(b) by 14 days.

(21) Appl. No.: 09/751,025

(22) Filed: Dec. 29, 2000

(65) Prior Publication Data

US 2002/0121226 A1 Sep. 5, 2002

(51) Int. Cl.$^7$ .............................. E02D 3/12; C09K 17/14
(52) U.S. Cl. ...................... 106/272; 106/270; 106/271; 47/DIG. 10; 405/264; 472/92
(58) Field of Search .................. 106/270, 271, 106/272; 47/DIG. 10; 405/264; 472/92

(56) References Cited

U.S. PATENT DOCUMENTS

| | | |
|---|---|---|
| 2,658,824 A | 11/1953 | Dickenson |
| 2,951,753 A | 9/1960 | Groves |
| 2,957,834 A | 10/1960 | Moller et al. |
| 3,017,720 A | 1/1962 | Busch |
| 3,030,734 A | 4/1962 | Brickey |
| 3,303,609 A | 2/1967 | MacHenry |
| 3,536,471 A | 10/1970 | Ashley |
| 3,696,559 A | 10/1972 | Hatton |
| 3,713,253 A | 1/1973 | Urban |
| 3,948,830 A | 4/1976 | Donnelly et al. |
| 4,056,380 A | 11/1977 | Thiac |
| 4,106,296 A | 8/1978 | Leonard, Jr. et al. |
| 4,268,551 A | 5/1981 | Moore, Jr. |
| 4,285,748 A | 8/1981 | Booker et al. |
| 4,337,283 A | 6/1982 | Haas, Jr. |
| 4,501,420 A | 2/1985 | Dury |
| 4,521,452 A | 6/1985 | Highsmith |
| 4,790,691 A | 12/1988 | Freed |
| 4,818,585 A | 4/1989 | Shipp, Jr. |
| 4,819,933 A * | 4/1989 | Armond ..................... 405/264 |
| 4,827,665 A | 5/1989 | Hubbs, Jr. et al. |
| 4,867,613 A | 9/1989 | McLeod et al. |
| 4,867,614 A | 9/1989 | Freed |
| 4,916,855 A | 4/1990 | Halliday et al. |
| 4,925,493 A * | 5/1990 | Lamoreaux ................. 106/272 |
| 4,936,711 A | 6/1990 | Sasahara |
| 5,007,766 A | 4/1991 | Freed et al. |
| 5,014,462 A | 5/1991 | Malmgren et al. |
| 5,041,320 A | 8/1991 | Meredith et al. |
| 5,207,826 A | 5/1993 | Westland et al. |
| 5,264,029 A * | 11/1993 | Kviesitis ................ 106/287.17 |
| 5,326,192 A | 7/1994 | Freed |
| 5,404,671 A | 4/1995 | Farrow, Jr. et al. |
| 5,559,166 A | 9/1996 | Bearden |
| 5,588,783 A | 12/1996 | Brabston et al. |
| 5,711,795 A * | 1/1998 | Browning ................... 106/271 |
| 5,746,546 A | 5/1998 | Hubbs et al. |
| 5,961,389 A | 10/1999 | Dickinson |

FOREIGN PATENT DOCUMENTS

| | | |
|---|---|---|
| EP | 0 231 057 A2 | 8/1987 |
| WO | WO 8802419 | 4/1988 |
| WO | WO 97/27368 | 7/1997 |
| WO | WO 99/09114 | 2/1999 |

* cited by examiner

Primary Examiner—David Brunsman
(74) Attorney, Agent, or Firm—David E. Rogers; Squire, Sanders & Dempsey L.L.P.

(57) ABSTRACT

An improved surface material is particularly suited for non-turf baseball field applications such as the pitcher's mound and base paths. The material generally comprises clay, wax and sand and has a putty-like consistency. Cleats can penetrate the material but are not likely to pull it out in clumps upon removal of the cleats. Method for forming the surface includes spraying emulsified wax on a surface and mixing it with the surface material.

44 Claims, No Drawings

MALLEABLE SURFACE MATERIAL

FIELD OF THE INVENTION

The present invention relates to a method for forming a malleable surface material, and a surface material and surface made by the method.

BACKGROUND OF THE INVENTION

As used herein, the term "soil" refers to any particulate material of the earth, such as one or more of clay, sand, silt and/or decomposed granite, whether or not it contains organic matter. The term "clay" refers to any (1) inorganic earth surface material that is plastic when moist but hard when fired and that is comprised primarily of hydrous aluminum silicates and other minerals, or (2) substance having the properties of clay. Clay includes dry and wet clay and may or may not include organic matter.

The term "sand" means a loose granular material formed by the disintegration of rocks to form particles smaller than gravel but coarser than silt. Sand may or may not include organic matter. The term "silt" means loose, unconsolidated sedimentary material with rock particles usually 1/20 millimeter or less in diameter, and being generally smaller than sand but coarser than clay. Silt may or may not include organic matter.

As used herein, the term "decomposed granite" means granite rock decomposed into smaller particles, some of which have the consistency of silt and some of which have the consistency of sand. Decomposed granite may or may not include organic matter.

As used herein, the term "wax" means any solid (at room temperature), heat-sensitive substance comprised primarily of high molecular weight hydrocarbons or esters of fatty acids that are generally insoluble in water.

The term "emulsified" means to form an emulsion. As used herein, "emulsion" means a fluid formed by the suspension of (1) wax particles in a liquid, particularly water, or (2) liquid wax in another liquid, particularly water.

Several methods and products are known for conditioning or treating soil to create an improved surface. For example, it is known to mix organic binder with soil to create a conditioned soil product. This product forms a relatively hard, durable surface after being wetted, compressed and allowed to dry. Such an organic binder (plantago, also known as psyllium) used as a soil conditioner for stabilizing and enhancing water absorption and retention characteristics of soil is described in U.S. Pat. No. 4,827,665. It is also known to mix inorganic fibers, organic binder and soil to create an improved soil material. Moreover, the present inventor has also employed a mixture of sand, psyllium, and fiber as a loose unbound surface for an equestrian arena with advantageous shock absorbing and cushioning characteristics.

U.S. Pat. No. 5,961,389 to Dickinson discloses an equestrian surface that reduces shock and provides cushioning to the feet of running and jumping horses. The invention generally comprises sand, a hydrocarbon wax and at least one material selected from one or more of the following three classes of ingredients: (1) polyolefin fibers, polyvinyl chloride fibers, wood or a mixture thereof, (2) polyolefin particles; and (3) tire fibers, tire cord or a mixture thereof. Col. 2, ll. 59–64.

It is also, in general, known to add fiber to soil to increase the resistance of the soil to punching shear and reduce the compressibility of soil. Examples are described in U.S. Pat. No. 4,819,933 to V. J. Armond and U.S. Pat. No. 4,867,614 issued to W. W. Freed.

It is also known to use clay as an athletic surface. However, the clay forming such a surface dries out and must be watered to remain plastic and reduce dust. Sand and silt, alone or in combination, are generally too soft for athletic fields. For example, if used on a pitcher's mound, sand and/or silt can be dug out by the action of the pitcher's feet. Organic binders mixed with soil, then watered, compressed and allowed to dry, create a surface that is too hard and brittle for some applications; it is a surface on which a pitcher's cleats may slide.

There remains a need for an improved surface particularly suitable for use in certain (a) athletic applications, such as the non-turf portions of a baseball field, particularly a pitcher's mound, and (b) non-athletic applications.

With respect to a pitcher's mound, as a pitcher throws a pitch his leading foot moves forward and presses down upon the soil on the front portion of the mound. His trailing foot also lands on this front portion of the mound. After throwing a pitch the pitcher returns to the rubber portion of the mound. The impact of the pitcher's feet upon the soil and removal of his cleats can create divots or depressions or otherwise deform the surface of the soil. Often the pitcher and/or the ground crews work to adjust or correct the consistency or level of the surface where the pitcher lands after throwing a pitch. Additionally, the action of player's cleats upon other non-turf portions of infields can create divots or other deformations of the surface that are undesirable.

SUMMARY OF THE INVENTION

The invention is a surface material used to form an improved surface, a method for forming the surface material, and an improved surface utilizing the surface material. The surface material is particularly suited for use in an application where the surface should be (1) firm, and (2) malleable enough (a) to allow for the penetration of cleats, (b) to allow for relatively easy repair, and (c) to resist being pulled out in clumps, thereby creating divots, upon removal of the cleats. The surface material can preferably be refinished without adding water (although water can be added), is relatively dust free and water resistant. The surface material of the invention is preferably a mixture of wax, clay, decomposed granite, and/or sand having the above-mentioned attributes. Any surface material having suitable physical properties, however, may be used.

The surface material of the invention functions by providing an improved surface. The manner in which it performs this function is by providing a mixture comprising wax and clay, and preferably some sand or decomposed granite. The result is a surface that cleats can penetrate, but that resists having divots pulled out of it when the cleats are removed. The method of the invention functions to treat one or more materials, such as clay, sand, silt, soil and/or decomposed granite to form a surface material. The way in which it treats the material(s) is by adding wax and the result is a malleable surface material that cleats can penetrate, but that resists having divots pulled out of it when the cleats are removed.

The invention also includes a method of adding an emulsified wax to a material such as clay, sand, silt, soil and/or decomposed granite. A method of adding emulsified wax to one or more materials performs the function of adding wax without the need to heat the wax or the material. The way in which it functions is by providing the wax in a liquid emulsion. The result is that a malleable surface material is formed.

In addition to functioning in the manner described and producing the results described, a surface according to the invention preferably provides the following benefits: (1) little or no need to water it to reduce dust or to maintain the surface at the proper consistency, (2) relatively good water resistance so that it does not get muddy, (3) cohesiveness and malleability for (a) relatively easy repair.

DETAILED DESCRIPTION OF A PREFERRED EMBODIMENT

A mixture according to the invention includes wax and clay and optionally one or more of sand, silt and decomposed granite. The preferred mixture includes between about 50–62% decomposed granite, between about 25–31% clay and between about 7–25% wax. These percentages are by weight. However, any surface material having the appropriate physical properties, as set forth herein, could be used to practice the invention.

The preferred clay comes dried in packages and is called "Mud Gel Wyoming Bentonite" sold by Baroid Drilling Fluids, P.O. Box 1675, Houston, Tex. 77251. This clay was used to form the samples described below. However, it is believed that any clay could be used to practice the invention and the clay could either be dry or moist. The purpose of the clay is to provide particles that are cohesive when wetted (such as by a wax) to form a malleable, and sufficiently firm, surface material.

Among the waxes that may be used to practice the invention is IGI 422. IGI 422 is a microcrystalline-based slack wax. It has the tackiness and flexibility that are common with some grades of microcrystalline waxes. It is recommended for use as a coating or for impregnating for waterproofing, sweeping compounds, metal protection, lubricating, polishing, tanning, and has the following physical properties:

| TEST METHODS | ASTM METHOD | SPECIFICATIONS | | TYPICAL |
| --- | --- | --- | --- | --- |
| | | Minimum | Maximum | |
| Drop Melt Point °F. (°C.) | D 127 | — | — | 166 (74.4) |
| Congealing Point °F. (°C.) | D 938 | 153 (67.2) | 167 (75) | 160 (71.1) |
| Kinematic Viscosity, cSt @ 210° F. (98.9° C.) | D 445 | 16.0 | 23.0 | 19.5 |
| Saybolt Viscosity, SUS @ 210° F. (98.9° C.) | D 2161 | 81.9 | 111.4 | 96.4 |
| Solvent Extractables*, Wt % | D 3235* | — | — | 20.0 |
| Flash Point (P.M.), °F. (°C.) | D 93 | 464 (240) | — | 504 (262) |
| Color | D 1500 | — | — | 3.0 |

*Modified test method. 1 g sample/30 mls solvent (60% MEK, 40% Toluene)

FDA STATUS: IGI 422 is not intended for food contact.

IGI 1266U is another wax that may be used to practice the invention. IGI 1266U is a relatively high melting, refined paraffin wax and may be used for applications that do not require a wax meeting FDA specifications. IGI 1266U has the following physical properties:

| | PHYSICAL PROPERTIES | | | |
| --- | --- | --- | --- | --- |
| TEST METHODS | ASTM METHOD | SPECIFICATIONS | | TYPICAL |
| | | Minimum | Maximum | |
| Congealing Point °F. (°C.) | D 938 | 154 (67.8) | 160 (71.1) | 157 (69.4) |
| Kinematic Viscosity, cSt @ 210° F. (98.9° C.) | D 445 | 6.7 | 7.8 | 7.3 |
| Saybolt Viscosity, SUS @ 210° F. (98.9° C.) | D 2161 | 48.1 | 51.8 | 50.1 |
| Oil Content, Wt % | D 721 | — | 1.0 | — |
| Color | D 1500 | — | — | L1.0 (Off-white/tan) |
| Odor | D 1833 | — | — | 2 |
| Needle Penetration, dmm @ 77° F. (25° C.) | D 1321 | — | — | 12 |

FDA STATUS: IGI 1266U is not intended for food contact.

Each of the above-described waxes are sold by The International Group, Inc., with locations at: 85 Old Eagle School Road, P.O. Box 384, Wayne, Pa. 19087 and 50 Salome Drive, Agincourt, Ontario, CANADA M2S 2A8.

The purpose of the wax is to make the surface material malleable and to add cohesiveness between the particles, e.g., the soil, clay, sand, silt and/or decomposed granite particles. Any wax capable of performing these functions may be used. As added benefits, the wax makes the surface material malleable without the use of water (or with minimal water) and the surface material remains malleable without adding additional water (i.e., it does not dry out, or it dries out much more slowly than clay with water added to it). Another benefit of the wax is that the surface material is relatively water resistant, so it is less likely to become muddy, and water will tend to run off it. Too much wax may make the surface material too hard or too soft (mushy or gooey).

A surface material according to the invention preferably includes sand or another material, such as decomposed granite, that includes sand particles or particles that perform the same function as sand in the surface material. The sand is believed to help aggregate the surface material; it makes the surface material harder and able to support a greater load (i.e., the surface material is more load bearing). The addition of too much sand could make the surface material too grainy or brittle, and/or lead to a material that does not compact well and that is not sufficiently malleable. Without sufficient sand the surface material may be too soft and lack sufficient compressive strength.

Virtually any decomposed granite (also referred to as "D.G.") having sand particles may be used, including ¼" D.G. or D.G. finely screened to 2 mil size. Decomposed granite was used in the samples described herein. The decomposed granite and bentonite mix used in samples B–E, described below, had the following properties:

Sieve Analysis

| Sieve Size | % Passing |
| --- | --- |
| #10 | 100 |
| #16 | 97.4 |
| #40 | 77.8 |
| #100 | 56.8 |
| #200 | 48.2 |

Hydrometer

Passing 0.02 mm = 40.0%
Passing 0.002 mm = 10.0%
Passing 0.001 mm = 2.0%

The ¼" decomposed granite used in samples F and G, described below, had the following properties:

Sieve Analysis

| Sieve Size | % Passing |
| --- | --- |
| ⅜" | 100 |
| ¼" | 99.6 |
| #4 | 99.2 |
| #8 | 81.7 |
| #10 | 74.4 |
| #16 | 58.6 |
| #40 | 37.0 |
| #100 | 20.2 |
| #200 | 13.4 |

Hydrometer

Passing 0.02 mm = 40.0%
Passing 0.002 mm = 10.0%
Passing 0.001 mm = 2.0%

A surface material according to the invention may include one or more organic binders, such as dried and ground plantago (also known as "psyllium") or dried and ground guar. The organic binder typically exhibits a swell volume (an increase in volume when it has absorbed its capacity in water) in the range of 25%–45% and preferably about 35%. Other binders, either organic or inorganic, may be utilized. The amount and type of binder included (if any) is chosen to provide the desired binding of the soil particles. The binder may be added in any manner, including bucket blending, belt blending hand tilling, or a surface application, each of which are known by people skilled in the art of manufacturing conditioned soil product. The binder may be added when the wax is mixed with other ingredients to form a surface material, or at another time.

The materials may be mixed in any manner to form a surface material according to the invention, including bucket mixing using a front-end loader, hand or machine tilling, or using a concrete mixer. Preferably, the wax and/or other ingredients are heated prior to or during the mixing step. Water or other materials, such as gravel, silt, organic binder or other organic materials, may be added to, or be present in, the mixture and may be present in the finished surface product. The method used to make the samples described herein that include wax was to place the materials in a concrete mixer and add the wax at a temperature between 150° F. and 200° F. and mix until the mixture appeared wetted, or moist, and little dust was observed. The mixing appeared to be more efficient the closer the wax was to 200° F.

Additionally, either of the above-identified waxes (or any wax suitable for practicing the invention) may be provided in an emulsion such as an emulsion with water, the procedure for making such an emulsion being known to persons skilled in the art of emulsifying materials such as wax. The emulsion can then be stored and/or shipped in any suitable containers, such as cans, tanks or drums. The emulsion can be added to soil, clay, sand, silt and/or decomposed granite in any fashion, such as by pouring or spraying it onto a surface, or by adding it to a mixer (such as a concrete mixer) including the soil, clay, silt, sand and/or decomposed granite. The emulsion can then be mixed, using any method, with other materials to form a surface material according to the invention. Among the mixing methods that may be used are bucket blending, using a concrete mixer, hand tilling or machine tilling. Water may be added before or during mixing, although the water in the emulsion should be adequate to make the material easy to mix. The resulting surface material, which is a mixture of the emulsified wax, soil, sand, silt, clay and/or decomposed granite, may then be dried (as may any surface material that includes water) by any suitable method, such as open air drying or forced air-drying, prior to being applied to a surface. Alternatively, if the surface material is already on the surface or is placed on a surface before being dried, it may be dried in any manner, including the methods discussed above, A surface material including water may also be dried in stages. For example, it may be dried prior to being applied to a surface to remove some water and then be dried to remove more water after being applied to the surface.

The advantage of using emulsified wax is that the wax and/or other materials mixed to form a surface material according to the invention need not be heated to mix them efficiently. Additionally, the emulsified wax could be provided in small or large containers and applied to a surface (such as by spraying) with relative ease. Therefore, lay persons could easily use the product to form a surface material and surface according to the invention, either by spraying the wax onto a surface and then mixing it with the surface soil, or by first adding a layer, such as soil, clay, or a clay-decomposed granite mix, and then spraying the emulsified wax over the layer and mixing the two. Furthermore, if the emulsified wax had the right properties, including as a relatively low viscosity, it could be added to a surface and soak in to treat it and form a surface material according to the invention, thereby eliminating the mixing step. But, the surface would still preferably be compressed, as described below.

Among the surface materials which have been prepared are (1) a mixture comprising (a) 1000 lbs. red, decomposed granite finely screened to 2 mil size, (b) 5 lbs. of dried and ground plantago (psyllium) comprised of about 95–98% plantago husk, (c) 500 lbs. of bentonite clay, (d) 250 lbs. of Intrapet 160 paraffin wax sold by Industrial Raw Materials of New York, N.Y.; (2) Sample B comprising (a) 100 lbs. of decomposed granite, and (b) 50 lbs. of dry bentonite clay; (3) Sample C comprising (a) 100 lbs. of decomposed granite, (b) 50 lbs. of dry bentonite clay, and (c) 12 lbs. of wax, (4) Sample D comprising (a) 100 lbs. of decomposed granite, (b) 50 lbs. of dry bentonite clay, and (c) 25 lbs. of wax; (5) Sample E comprising (a) 100 lbs. of decomposed granite, (b) 50 lbs. of dry bentonite clay, and (c) 50 lbs. of wax; (6) Sample F comprising ¼" decomposed granite with dried and ground plantago comprised of about 95–98% plantago husk mixed in at a rate of about 10 lbs. per ton; and (7) Sample G comprising (a) 100 lbs. of ¼" decomposed granite with dried and ground plantago comprised of about 95–98% plantago husk, and (b) 17 lbs. of wax. The wax used in samples C, D, E and G was IGI 422.

Samples B–G were tested and the results are reproduced below. The samples were prepared and tested much in the same manner that concrete is tested for unconfined compressive strength. Basically, small cylinders of each sample were prepared that were compressed to determine their unconfined compressive strength. The unconfined compressive strength basically measured the pressure required to either visually deform or break the sample. The methods of preparing such samples and testing them to determine the values set forth herein is known to persons skilled in these test methods.

Samples B–G were each compacted using 2 lifts (as known to persons skilled in this manner of testing, a lift is a layer) in a 2"×4" brass split mold wherein each lift was loaded to a pressure of 400 pounds per square inch ("psi"). The 400 psi loading was selected after determining that this was the highest loading that many of the samples could take before part of the sample would begin to extrude from the mold. After trying various moisture contents, 10% added moisture was added to each of Samples B–D in order to soften the sample, thus making it easier to add to the mold. Exceptions to this were Sample G, which extruded moisture under loading, Sample E (after heating to 150° F. the sample became mushy, so no water was added) and Sample F (which was mixed with 25% water to a flowable state and poured into a mold).

Samples C, D, E and G (each of which contained wax) were heated to 150° F. for 5 hours, dry mixed for 1 minute, reheated to 150° F., had 10% hot water added (except for E) and remixed for 1 minute, before compacting. After compacting, Samples C, D and E were removed from the mold and allowed to air cure at 70° F. for 48 hours prior to testing. G was air cured at 70 deg. F. overnight in the mold, and then removed from the mold and air cured at 70 deg. F. for the balance of a 48-hour period, prior to testing.

Sample B had 10% water added, was mixed for 1 minute and compacted. It was removed from the mold and air cured at 70° F. for 48 hours prior to testing.

Sample F had 25% water added, was mixed for 1 minute, poured into the mold, oven cured in the mold for 48 hours at 120° F. and then air cured (out of the mold) at 70° F. for 48 hours prior to testing.

All samples were tested for unconfined compressive strength in accordance with ASTM D 2166 at a strain of 0.05" per minute. Unless otherwise stated, all densities are in lbs/ft$^3$. Wet density (initial), % water (initial) and dry density (initial) were measured after the material was compacted in the mold. Wet density at time of testing, %water at time of testing and dry density at time of testing were measured after samples had been removed from the molds and cured in the manner described herein. The percentage of $H_2O$ by weight of the sample was determined by comparing the weight of a sample after drying in an oven to the weight of the sample before drying in an oven. The dry density was determined based upon the weight of the sample after being dried in the oven. Samples that had no water added (such as Sample E) still contained some water, which must have been absorbed by, or otherwise present in, the sample material.

The rate of strain is based upon the percentage of the original height of the sample per minute that the sample was being compressed (e.g., Sample B was compressed at a rate of 1.7% per minute of its height at the time of testing). Strain at failure is the point at which brittle failure or visual deformation occurred and is based on the height of the sample. For example, Sample B failed when it had been compressed to 93.2% of its original height, which gave a strain at failure of 6.8%. Strain measurements were taken, during loading, with a dial indicator. The results follow:

Test Results For Sample B
Initial Compacting—400 psi static load in 2 lifts, w/10% water added
Initial cure—48 hours @ 70 Deg. F.
Average rate of strain—1.7% per minute
Dia. of specimen @ time of testing—1.984375"
Height of specimen @ time of testing—2.9375"
Height to diameter ratio—1.480 (correction factor for strength=0.96)
Strain at failure=6.8%
Wet density (initial)—129.3; % $H_2O$ (initial)=14.3%
Dry density (initial)=113.1
Wet density @ time of test=124.6; % H2O at time of test=7.5; Dry density at time of test=115.9
Unconfined compressive strength=193.5 psi
Observations: Normal failure, brittle.

Test Results For Sample C
Initial Compaction—400-psi static load in 2 lifts, w/10% water added (at 150 Deg. F.)
Initial cure—48 hrs. @ 70 Deg. F.
Average rate of strain—1.5% per minute
Dia. of specimen @ time of testing—2.00"
Height of specimen @ time of testing—3.25"
Height to diameter ratio=1.63 (correction factor for strength=0.97)
Strain at failure=4.6%
Wet density (initial)=122.9; % H2O (initial)=8.5%
Dry density (initial)=113.3
Wet density @ time of test=118.9; % H2O at time of test=6.2; Dry density at time of test=112.0
Unconfined compressive strength=96.6 psi
Observations: Uniform break, brittle Test Results For Sample D
Initial Compaction—400 psi static load in 2 lifts, w/10% water added (at 150 Deg. F.)
Initial cure 48 hrs. @ 70 Deg. F.
Average rate of strain—1.6% per minute
Diameter of specimen @ time of testing—2.00"
Height of specimen @ time of testing—3.0625"
Height to diameter ratio=1.53 (correction factor for strength=0.96)
Strain @ Failure=6.5%
Wet density (initial)=120.7; % H2O (initial)=9.4%; Dry density (initial)=113.3
Wet density @ time of test=117.3; % H2O at time of test=6.7; Dry density at time of test=109.9
Unconfined compressive strength=56.5 psi
Observations: Yielded very uniformly, still cohesive after testing. Sample could not be manually pulled apart for moisture testing, so entire sample was tested.

Test Results for Sample E
Initial compaction 400 psi static load in 2 lifts, w/no water added (at 150 Deg. F.)
Initial cure—48 hrs. @70 Deg. F.
Average rate of strain—1.2% per minute
Diameter of specimen @ time of testing—2.00"
Height of specimen @ time of testing—4.0625"
Height to diameter ratio—2.03
Strain at failure—6.2%
Wet density (Dry density (initial))—108.8
Wet density @ time of test=107.1; % H2O at time of test=2.2; Dry density at time of test=104.8
Unconfined compressive strength=11.7 psi
Observations: Yielded uniformly, temperature sensitive, low strength.

Test Results For Sample F
Initial compaction—NA. Mixed with 25% water to a flowable state and poured into mold.
Initial cure—Oven cured for 48 hours @ 120 Deg. F. Removed from mold and air cured for 48 hrs. @ 70 Deg. F.
Average rate of strain—1.3% per minute
Diameter of specimen at time of testing—1.96875"
Height of specimen—3.875"
Height to diameter ratio—1.97
Strain at failure—2.6%
Wet density (initial)=123.7
Wet density @ time of testing=106.8; % H2O at time of testing=0.12, Dry density at time of testing=106.7
Unconfined compressive strength=78.4 psi
Observations: Shear failure, brittle.
Test Results for Sample G
Initial compaction—400-psi static load in 2 lifts w/10% water added (at 150 Deg. F.).
Initial cure—cured overnight @ 70 deg. F in mold, removed from mold and air cured at 70 deg.
F for balance of 48 hrs.
Average rate of strain—1.4% per minute
Diameter of specimen at time of testing—2.00"
Height of specimen—3.50"
Height to diameter ratio—1.75 (correction factor for strength=0.98)
Strain at failure=4.3%
Wet density (initial)=129.3; % H2O (initial)=8.1%; Dry density (initial)=119.6
Wet density at time of testing=127.8; % H2O at time of testing=1.8; Dry density at time of testing=125.5
Unconfined compressive strength=43.7 psi
Observations: over optimum amount of water at time of compaction, unstable (cohesionless) when wet.

Summary of Laboratory Testing Results

| Sample | Unconfined Compressive Strength | Shear Strength (psi) | Dry Density (pcf) | Moisture (%) | Friction Angle (degrees) |
|---|---|---|---|---|---|
| B | 193.5 | 96.8 | 115.9 | 7.5 | 44.0 |
| C | 96.6 | 48.3 | 112.0 | 6.2 | — |
| D | 56.5 | 28.3 | 109.9 | 6.7 | — |
| E | 11.7 | 5.9 | 104.8 | 2.2 | — |
| F | 78.4 | 39.2 | 106.7 | 0.1 | 45.0 |
| G | 43.7 | 21.9 | 125.5 | 1.8 | — |

Samples D, E and G did not exhibit brittle failure (i.e., the samples did not break). Instead, the strain at failure was measured at the point when a visual deformation of the sample was detected.

The surface material may be applied to a surface in any manner, such methods applying surface material being known to those skilled in the art. Generally, the material would be placed upon the surface, using any method, at a desired depth and compressed, using any method, prior to use. It may also be graded, raked, watered and/or dried prior to use.

A surface layer utilizing the invention can be any depth and would generally be between 2" and 6" depending upon the application. For example, a layer of about 6" in depth could be used for pitcher's mounds or equestrian racing tracks. A layer on a base path could be between ¼" and 3" deep. Any surface can utilize the invention, especially non-turf surfaces such as baseball infields, soccer fields, hand ball courts, tennis courts, horse training, exercising, jumping and racing surfaces, parking lots, highway berms and embankments, and sand bunker liners.

Surface material according to the invention can be repaired in many ways, including by (1) compressing or molding it with a hand tool, (2) raking it, (3) adding additional surface material to an area to be repaired, or (4) any combination of (1)–(3). Additionally, some water may be added to the surface material when making repairs in order to make the surface material even more malleable. Additionally, repairs may be made utilizing rollers or tools that provide heat to soften the wax. Such rollers or tools may provide heat to the roller or tool or directly to the surface material, and may include a hot air blower to provide the heat. Further, a separate hot air blower could heat the surface material before or during repairs.

Having now described preferred embodiments of the invention variations that do not depart from the spirit thereof may become apparent to others. The invention is thus not limited to the preferred embodiments but is instead set forth in the following claims and legal equivalents thereof. Unless stated otherwise in the claims, method steps may be performed in any order capable of providing a result according to the invention.

What is claimed is:

1. A surface material comprising:
   (a) 10–30% clay particles;
   (b) 30–80% decomposed granite particles; and
   (c) 10–40% wax of a type to make the surface material malleable and to add cohesiveness between the particles.

2. The surface material of claim 1 wherein the clay is dry clay.

3. The surface material of claim 2 wherein the dry clay is bentonite.

4. The surface material of claim 1 wherein the clay is bentonite.

5. The material of claim 1 wherein the wax has a drop melt point of about 166° F.

6. The material of claim 1 wherein the wax has a congealing point of between 150° F. and 167° F.

7. The material of claim 1 wherein the wax has a kinematic viscosity between 16 and 23.

8. The material of claim 1 wherein the wax has a kinematic viscosity between 6.7 and 7.8.

9. The material of claim 1 wherein the wax has a kinematic viscosity between 6.7 and 23.

10. The material of claim 1 wherein the wax has a Saybolt viscosity between 81.8 and 111.4.

11. The material of claim 1 wherein the wax has a Saybolt viscosity between 48.1 and 51.8.

12. A surface material made by the method of mixing clay with emulsified wax of a type to make the surface material malleable and to add cohesiveness between the particles.

13. The surface material of claim 12 wherein the wax is emulsified in water.

14. The surface material of claim 13 wherein the wax is liquid while emulsified.

15. The surface material of claim 14 wherein the wax is a microaryotalline based slack wax.

16. The surface material of claim 12 wherein the surface material is dried after the clay and emulsified wax are mixed.

17. The surface material of claim 12 that further comprises the step of placing a layer of the surface material on a surface.

18. The surface material of claim 17 wherein the layer is between 2" and 6" deep.

19. The surface material of claim 17 wherein the surface material is dried before placing it on the surface.

20. The surface material of claim 17 that further includes the step of transporting the surface material prior to placing a layer on the surface.

21. The surface material of claim 20 wherein the mixture is at least partially covered with a moisture-proof barrier during the step of transporting.

22. The surface material of claim 21 wherein the moisture-proof barrier is comprised of plastic.

23. The surface material of claim 12 wherein the surface material further comprises decomposed granite and is made by the method of mixing decomposed granite, clay and emulsified wax.

24. The surface material of claim 12 wherein neither the clay nor the wax are heated prior to or during the mixing step.

25. The surface material of claim 12 wherein, the emulsified wax is placed onto a surface comprising clay prior to mixing the clay and emulsified wax.

26. The surface material of claim 25 that further includes the step of mixing the wax with the surface material to form a mixture.

27. The surface material of claim 25 wherein the mixing is done by tilling the mixture by hand.

28. The surface material of claim 25 that further includes the step of compressing the mixture of wax and surface material.

29. The surface material of claim 28 wherein the mixture is compressed using a roller.

30. The surface material of claim 25 wherein neither the soil material nor the emulsified wax is heated prior to or during mixing.

31. The surface material of claim 25 wherein the surface material is part of a pitcher's mound.

32. The surface material of claim 12 wherein the surface material further comprises silt and is formed by the method of mixing silt, clay and emulsified wax.

33. The surface material of claim 12 wherein the surface material includes gravel.

34. The surface material of claim 12 wherein the surface material includes organic binder.

35. The surface material of claim 34 wherein the organic binder is dried and ground plantago.

36. The surface material of claim 35 wherein the dried and ground plantago consists of 80% or more plantago husk.

37. A surface material comprising wax of a type to make the surface material malleable and to add cohesiveness between the particles and clay and having the following properties:

(a) A dry density of between 100 and 115 lbs/ft; and (b) An unconfined compressive strength of between 10 and 100 psi, wherein there is not brittle failure of the surface material.

38. The surface material of claim 37 that further includes a shear strength of between 5 and 50 psi.

39. The surface material of claim 37 that further includes a shear strength of between 5 and 50 psi.

40. The surface material of claim 37 that further includes silt.

41. The surface material of claim 37 that further includes decomposed granite.

42. A method for repairing a surface material, the surface material comprising clay and wax of a type to make the surface material malleable and to add cohesiveness between the particles, the method comprising the step of working the surface material with a heated tool.

43. The method of claim 42 wherein the tool is a rake and the working includes raking the surface material.

44. The method of claim 42 wherein the tool is a roller and the working includes compacting the surface material.

* * * * *